United States Patent
Kamachi

(10) Patent No.: US 8,866,333 B2
(45) Date of Patent: Oct. 21, 2014

(54) POWER CONTROL SYSTEM AND VEHICLE POWER CONTROL DEVICE

(75) Inventor: Makoto Kamachi, Tokyo (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 793 days.

(21) Appl. No.: 13/164,568

(22) Filed: Jun. 20, 2011

(65) Prior Publication Data

US 2011/0309674 A1 Dec. 22, 2011

(30) Foreign Application Priority Data

Jun. 21, 2010 (JP) .................. 2010-140363

(51) Int. Cl.
*B60L 1/00* (2006.01)
*B60L 11/18* (2006.01)

(52) U.S. Cl.
CPC .............. *B60L 11/1824* (2013.01); *Y02T 90/14* (2013.01); *Y02T 90/128* (2013.01); *Y02T 10/7005* (2013.01); *Y04S 10/126* (2013.01); *Y02T 10/7066* (2013.01); *Y02E 60/721* (2013.01); *B60L 11/1842* (2013.01); *Y02T 90/163* (2013.01); *Y02T 10/7088* (2013.01); *B60L 11/1868* (2013.01); *B60L 1/006* (2013.01)

USPC ....................................................... 307/10.1

(58) Field of Classification Search
USPC ....................................................... 307/10.1
See application file for complete search history.

(56) References Cited

U.S. PATENT DOCUMENTS

2009/0026841 A1* 1/2009 Nakanishi .................. 307/66
2011/0204720 A1* 8/2011 Ruiz et al. .................. 307/66

FOREIGN PATENT DOCUMENTS

JP 2-142329 A 5/1990

* cited by examiner

*Primary Examiner* — Jared Fureman
*Assistant Examiner* — Dru Parries
(74) *Attorney, Agent, or Firm* — Birch, Stewart, Kolasch & Birch, LLP

(57) ABSTRACT

A power control system includes a vehicle having a first battery and a second battery separate from the first battery; a power converter provided at a building, the power converter converting power charged in the first battery and supplying the converted power to electrical equipment; a first connection line connecting the first battery and the power converter and supplying the power from the first battery to the power converter; and a second connection line connecting the second battery and the power converter and supplying control power to activate the power converter from the second battery to the power converter.

9 Claims, 4 Drawing Sheets

POWER CONTROL SYSTEM AND VEHICLE POWER CONTROL DEVICE

CROSS-REFERENCE TO THE RELATED APPLICATION

This application incorporates by references the subject matter of Application No. 2010-140363 filed in Japan on Jun. 21, 2010 on which a priority claim is based under 35 U.S.C.§119(a).

FIELD

The present invention relates to a power control system that manages power supplied from a vehicle to electrical equipment, and a vehicle power control device.

BACKGROUND

An electric vehicle is equipped with a driving battery that stores power by electric charge. The electric vehicle runs as a motor is supplied with and driven by the power stored in the driving battery. A lithium-ion battery or a nickel-hydride battery, for example, each of which has high energy density, is used as the driving battery. The driving battery is charged from a household outlet or with a quick charger installed at a shopping mall.

The electric vehicle can also supply power stored in the driving battery to equipment at buildings. In particular, a technology is proposed to supply power from an electric vehicle to equipment as a backup power source in power outage (refer to Patent Literature 1, for example).

According to a household power outage backup system of Patent Literature 1, in response to detection of a household power outage, an automotive controller installed in a house transmits a starting signal to an engine starter installed in a vehicle to start an engine. The starting engine drives a power generator mounted in the vehicle. Power generated by the power generator is supplied through a power supply connecter and is converted to an alternating current by a DC/AC inverter installed in the house. The power is then supplied to devices that require an emergency power source.

[Patent Literature 1] Japanese Unexamined Patent Application Publication No. H2-142329

Patent Literature 1, however, does not disclose or teach how the automotive controller and the DC/AC inverter installed in the house are operated without power supply due to a power outage. It is assumed that a dry-cell battery or an emergency battery is probably provided in the house such that power is supplied to the automotive controller and the DC/AC inverter even in a power outage.

Specifically, it is first necessary to control equipment at a building, to receive power supply from the electric vehicle in a power outage in the technology of Patent Literature 1. Furthermore, a power source for the control, i.e., a power storage device, such as an emergency battery, must be installed in the equipment. Since the power storage device is unnecessary other than emergency, such as a power outage, a space for storing the power storage device is a waste in normal time. Furthermore, since a battery spontaneously discharges even if not used, the battery should be replaced periodically with a new one even if unused, thus increasing the maintenance cost.

SUMMARY

In view of such circumstances, an object of the present invention is to supply power to electrical equipment only from a vehicle without a further power supply source, e.g., a battery, in equipment at a building.

Accordingly, the present invention provides a power control system including a vehicle having a first battery and a second battery separate from the first battery; a power converter provided at a building, the power converter converting power charged in the first battery and supplying the converted power to electrical equipment; a first connection line connecting the first battery and the power converter and supplying the power from the first battery to the power converter; and a second connection line connecting the second battery and the power converter and supplying control power to activate the power converter from the second battery to the power converter.

According to the power control system of the present invention, power can be supplied to the electrical equipment only from the vehicle even without driving power for the power converter. For instance, even in a power outage at a house in which the power converter is installed, the electrical equipment in the house can be used, including an emergency lamp, an emergency call device, and an emergency wireless device. Furthermore, a power storage device for emergency, such as an emergency battery is not necessary in the house, thus securing the space and reducing the cost.

Note that the term "building" as used herein encompasses a wide range of structures, including houses, plant factories, and garages.

The term "power converter provided at a building" refers not only to a power converter provided in a building, but also to the one provided outdoors related to the building (e.g., the one provided in the garden or vacant land near that building).

Furthermore, the term "equipment" refers not only to equipment fixed on a floor or wall of a building, but also to movable equipment (such as a lawnmower and household appliances).

DESCRIPTION OF EMBODIMENT

Embodiments of a power control system are explained below with reference to the attached drawings. The embodiments below are presented for exemplary purposes only and are not construed as excluding application of a variety of modifications and technologies not explicitly represented in the embodiments.

[1. Configuration of Power Control System]

Present embodiments will be described with reference to a house 20, as an example of a building.

Figure 1:
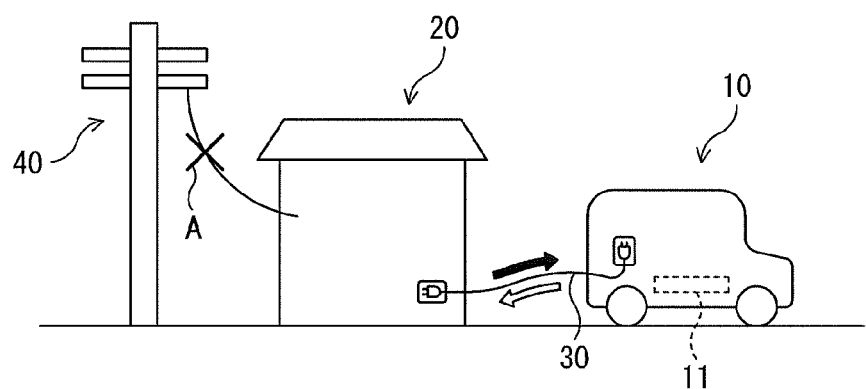
FIG. 1 is a schematic view of a power control system at work according to an embodiment of the present invention.

With reference to FIG. 1, in normal times (refers to time other than emergency where no power is supplied due to a power outage or failure, such as disconnection; same applies hereinafter), a power source of the house (building) 20, which is connected to a power line 40 from a power company, and an electric vehicle (vehicle) 10 are connected by a cable (cable member) 30. A driving battery (first battery) 11 mounted in the electric vehicle 10 is then charged by external power supply. A flow of power at this time is indicated by a solid arrow in FIG. 1.

In a state in which power supply from the power line 40 is stopped due to a power outage or failure, such as disconnection (hereinafter referred to as emergency), as shown with a cross A in FIG. 1, no electrical equipment in the house 20 can be used. Assuming such a state in which power supply to the house 20 is cut off, the power control system of the present embodiment is configured such that the electric vehicle 10 and the house 20 are connected through the cable 30, similar to a charging time. In the power control system, two types of power are supplied to electrical equipment in the house 20 from the driving battery 11 mounted in the electric vehicle 10, as shown with an outline arrow in FIG. 1, so as to allow use of an emergency radio and an emergency lamp. The configuration of the power control system is explained in detail below with reference to FIG. 2.

Figure 2:
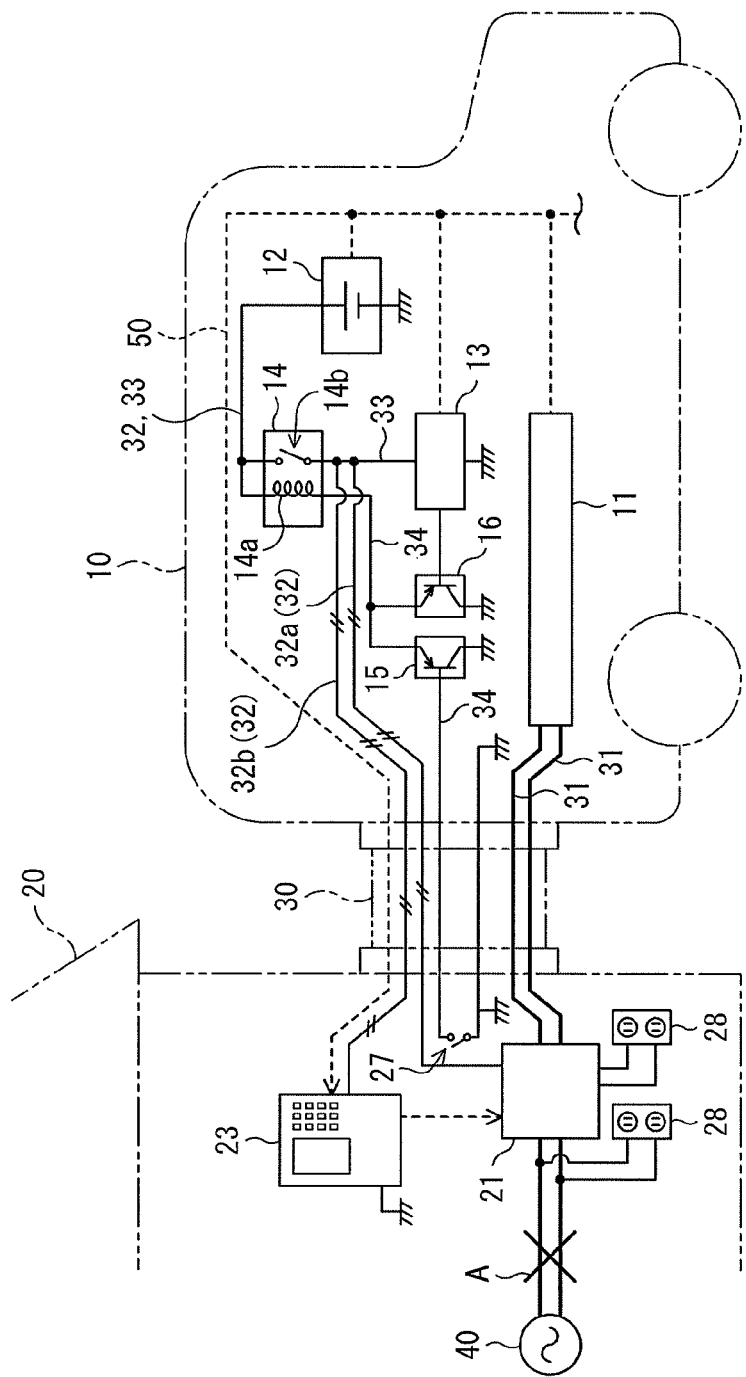
FIG. 2 is a schematic block diagram illustrating a configuration of the power control system according to an embodiment of the present invention.

FIG. 2 is a schematic block diagram illustrating the configuration of the power control system. As shown in FIG. 2, the electric vehicle 10 includes the driving battery 11 for running and an auxiliary battery (second battery) 12, which is provided separately from the driving battery 11 to operate auxiliary devices, such as an air conditioner and an audio device (not shown in the drawing). The driving battery 11 and the auxiliary battery 12 are controlled by a vehicle controller (second controller) 13. The vehicle controller 13, which is an electronic controller, constantly monitors the state of charge (hereinafter referred to as SOC) of the driving battery 11 and the auxiliary battery 12 and prevents over-discharge and over-charge. In addition to the components above, the electric vehicle 10 has other components, including a driving motor and a main controller (not shown in the drawing).

The driving battery 11 is a main power source of a driving motor, which is a driving source of the electric vehicle 10. The driving battery 11 is composed of, for example, a plurality of lithium-ion battery modules connected in series. In a normal run of the electric vehicle 10, power stored in the driving battery 11 is supplied to the driving motor through an inverter.

The auxiliary battery 12 is a power storage device having lower voltage than the driving battery 11. Power is supplied to the auxiliary devices mainly from the auxiliary battery 12. The auxiliary devices herein refer to devices other than the driving motor and include, for example, a power steering device, a light projector, and a variety of electronic control units.

A distribution board (not shown in the drawing) connected to the power line 40 from the power company is installed in the house 20. Power is supplied to a variety of electrical equipment and outlets 28 through the distribution board. To charge or discharge the driving battery 11 of the electric vehicle 10, the house 20 is provided with a power converter 21 and an equipment controller (first controller) 23, the power converter 21 converting between alternating current and direct current, the equipment controller 23 controlling electrical energy converted at the power converter 21.

The equipment controller 23 is connected to the vehicle controller 13 mounted in the electric vehicle 10 through a communication line 50. SOC information of the driving battery 11 is transmitted from the vehicle controller 13 to the equipment controller 23 through the communication line 50. Based on the SOC information of the driving battery 11, the equipment controller 23 controls the electrical energy charged to the driving battery 11 at normal times and the electrical energy discharged from the driving battery 11 in emergency. The communication line 50, which is included in an in-vehicle LAN (controller area network: CAN), is also connected to a main controller and sensors (not shown in the drawing), in addition to the equipment controller 23, the driving battery 11, and the auxiliary battery 12.

The equipment controller 23 is provided with a monitor that displays the operation state of the power converter 21 and a plurality of switches. The equipment controller 23 outputs a control signal to manually change the electrical energy converted at the power converter 21. The equipment controller 23 also outputs a control signal to stop charging or discharging to the power converter 21 and the vehicle controller 13.

As shown in FIGS. 1 and 2, the electric vehicle 10 and the house 20 are connected by the single cable 30 to charge or discharge the driving battery 11 of the electric vehicle 10. At this time, a plurality of devices installed in the electric vehicle 10 and the house 20 respectively are connected through a plurality of conductive wires (lines) in the cable 30.

The driving battery 11 of the electric vehicle 10 and the power converter 21 are connected by a charge/discharge line (first connection line) 31. At normal times, the equipment controller 23 controls the electrical energy charged to the driving battery 11. Specifically, the power from the power line 40 is converted from an alternating current to a direct current by the power converter 21, and then supplied to the driving battery 11 through the charge/discharge line 31. In emergency, the power charged in the driving battery 11 is supplied to the power converter 21 through the charge/discharge line 31, and then converted from a direct current to an alternating current by the power converter 21 to be supplied to a variety of electrical equipment.

The power converter 21 is activated by the power supplied from the power line 40 at normal times. In emergency, however, no power is supplied from the power line 40, and thus the power converter 21 is not activated. In the power control system, an equipment control line (second connection line) 32 is provided to supply power to the power converter 21 from the auxiliary battery 12 of the electric vehicle 10 in emergency.

The equipment control line 32 includes a power conversion line 32a and an equipment line 32b, the power conversion line 32a supplying control power to the power converter 21, the equipment line 32b supplying control power to the equipment controller 23. The power conversion line 32a and the equipment line 32b are collectively referred to hereinafter as the equipment control line 32.

The power conversion line 32a connects the auxiliary battery 12 and the power converter 21. The auxiliary battery 12 supplies control power to activate the power converter 21 through the power conversion line 32a to the power converter 21. The equipment line 32b connects the auxiliary battery 12 and the equipment controller 23. The auxiliary battery 12 supplies control power to activate the equipment controller 23 through the equipment line 32b to the equipment controller 23. Specifically, the control power from the auxiliary battery 12 is supplied by the equipment control line 32 to the power converter 21 and the equipment controller 23 in the house 20. The control power is thus secured even in case of a power outage at the house 20. Thereby, the power converter 21 and the equipment controller 23 can be activated to receive power supply from the driving battery 11.

Furthermore, a vehicle control line (third connection line) 33 is connected between the auxiliary battery 12 and the vehicle controller 13. The control power to activate the vehicle controller 13 is supplied from the auxiliary battery 12 to the vehicle controller 13 through the vehicle control line 33. The vehicle control line 33 is provided with a relay 14 thereon. The equipment control line 32 and the vehicle control line 33 are integrated into a single line from the auxiliary battery 12 to the relay 14. The equipment control line 32 is provided from the auxiliary battery 12 through the relay 14 and is then branched into the power conversion line 32a and the equipment line 32b on the downstream side of the relay 14. The downstream side of the relay 14 refers to a portion on the equipment control line 32 and the vehicle control line 33 and closer to the power converter 21 and the equipment controller 23 than the relay 14.

The relay 14 includes a coil 14a and an exciting switch 14b. The exciting switch 14b is connected and turned on only while the coil 14a is conducted. A push-type start switch 27 provided in the house 20 switches the conduction state to the coil 14a. In other words, connection/disconnection of the exciting switch 14b in the relay 14 is switched by the start switch 27.

An activating switch 15 to set the relay 14 to be connected in conjunction with the start switch 27 is provided on a switch line (fourth connection line) 34. The activating switch 15 is composed of a PNP transistor. Pressing the start switch 27 applies a current in the switch line 34. The current flowing in the switch line 34 allows the coil 14a in the relay 14 to be conducted and the exciting switch 14b to be connected. Thereby, the control power is supplied from the auxiliary battery 12 to the vehicle controller 13, the power converter 21, and the equipment controller 23.

Referring to FIG. 2, the start switch 27 may be provided separately from the equipment controller 23. Alternatively, the start switch 27 may be provided inside the equipment controller 23. The relay 14 and the start switch 27 are connected by the switch line 34.

A holding switch 16 composed of a PNP transistor and branched from the switch line 34 is provided between the relay 14 and the activating switch 15. The base of the holding switch 16 is connected to the vehicle controller 13 to be controlled thereby. Pressing the start switch 27 supplies the control power from the auxiliary battery 12 to the vehicle controller 13. A current then flows to the holding switch 16, and thereby the relay 14 stays connected.

The activating switch 15 and the holding switch 16 are not limited to PNP transistors. A variety of switches may be used that have a function to switch the state of connection of the relay 14. In order to stop the power supply from the auxiliary battery 12, the holding switch 16 is controlled to be turned off by the vehicle controller 13. The relay 14 is then turned off to stop supplying the control power to the power converter 21 and other devices.

[2. Operations]

Figure 3:
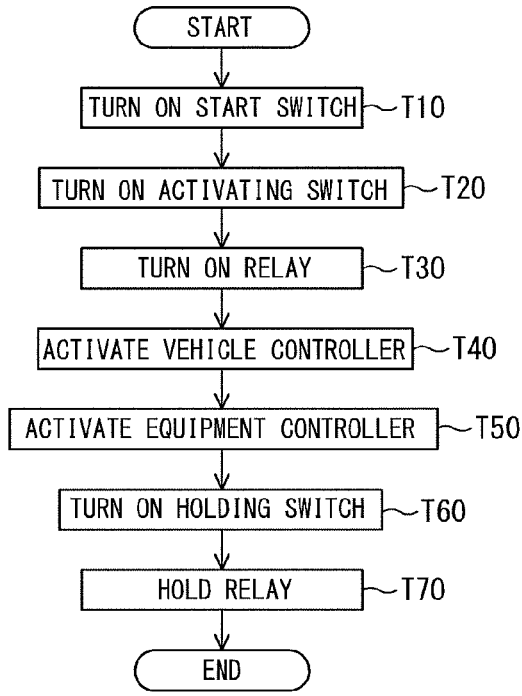
FIG. 3 is a flowchart illustrating the order of power distributions in the power control system according to an embodiment of the present invention.

With the configuration of the power control system of the embodiment, control power is supplied throughout the power control system in the sequence shown in FIG. 3 to start power supply in emergency.

The start switch 27 is first turned on manually or automatically (Step T10). Although only Step T10 may be performed manually, Steps T20 to T70 below are all performed automatically. The activating switch 15 is turned on in conjunction with turning on of the start switch 27 (Step T20), and the exciting switch 14b in the relay 14 is turned on (Step T30).

Upon turning on of the exciting switch 14b in the relay 14, power is supplied from the auxiliary battery 12 to the vehicle controller 13, which is then activated (Step T40). Concurrently, power is supplied from the auxiliary battery 12 to the equipment controller 23, which is then also activated (Step T50). Upon activation of the vehicle controller 13 in Step T40, the holding switch 16 is turned on (Step T60) and a current constantly flows to the coil 14a in the relay 14, thus keeping the exciting switch 14b connected (Step T70). In the state where the exciting switch 14b in the relay 14 stays connected, control power can be constantly supplied from the auxiliary battery 12 to the power converter 21, the equipment controller 23, and the vehicle controller 13.

To manually stop the power supply to the house 20 from the auxiliary battery 12, the equipment controller 23 is operated. The equipment controller 23 then outputs to the power converter 21 a control signal to stop charging or discharging, and thus the power supply stops. Furthermore, the equipment controller 23 outputs a similar control signal to the vehicle controller 13 through the communication line 50.

The vehicle controller 13 receives the control signal, and then controls and turns off the holding switch 16. Then, the conduction to the coil 14a in the relay 14 is blocked, and the exciting switch 14b is disconnected. The control power is thus stopped from being supplied to the power connection line 32a and the equipment line 32b. The control power is concurrently stopped from being supplied to the vehicle controller 13. Thereby, the circuits connected to the auxiliary battery 12 are completely shut off to prevent loss of control power (i.e., waste of standby energy).

Figure 4:
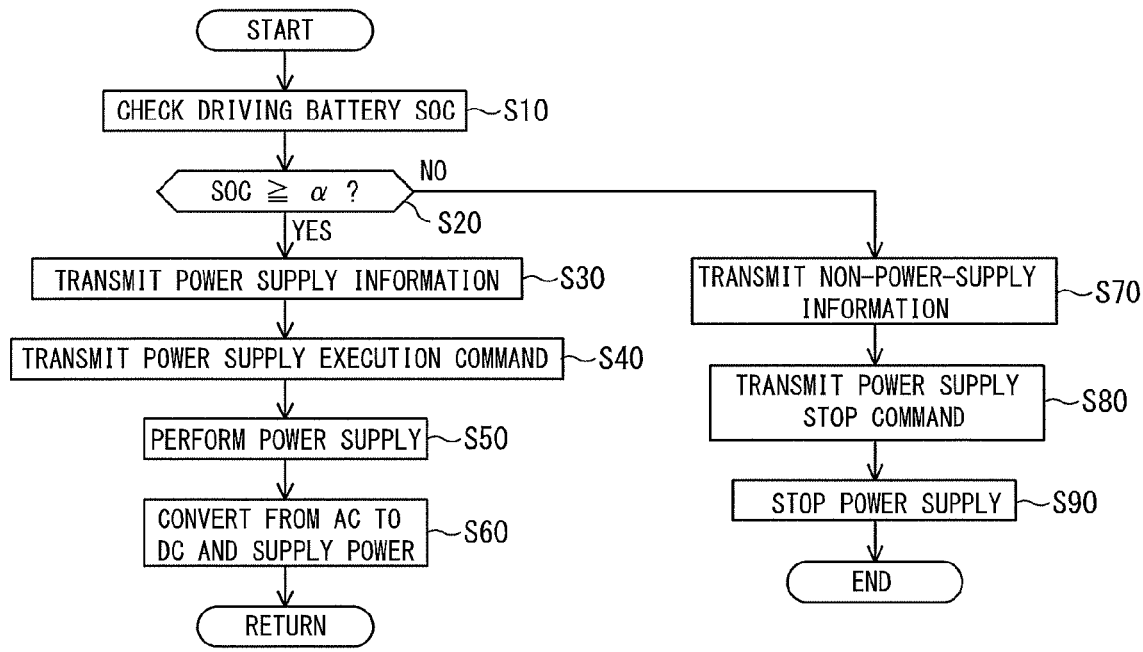
FIG. 4 is a flowchart illustrating the operations of the power control system according to an embodiment of the present invention.

To stop the power supply from the auxiliary battery 12 to the house 20 according to SOC determination instead of manual operation, the power control system operates as shown in FIG. 4 during the power supply from the auxiliary battery 12 to the house 20. First, the vehicle controller 13 checks an SOC of the driving battery 11 (Step S10). As described above, the vehicle controller 13 constantly monitors the SOC of the driving battery 11 and the auxiliary battery 12, not only during operation of the power control system.

It is then determined whether or not the SOC of the driving battery 11 is equal to or greater than a predetermined value $\alpha$ (Step S20). Since a battery life is generally shortened due to over-discharge, discharge is prevented if the remaining amount of the driving battery 11 is less than the predetermined value $\alpha$. The predetermined value $\alpha$ herein may be set or changed to an appropriate value by the equipment controller 23, for example, to 20%.

In Step S20, if the SOC of the driving battery 11 is equal to or greater than the predetermined value $\alpha$, representing that power can be supplied to the house 20, the vehicle controller 13 transmits, to the equipment controller 23 through the communication line 50, information indicating that power can be supplied (Step S30). Upon receiving the information, the equipment controller 23 transmits a command to execute power supply to the power converter 21 (Step S40). The power converter 21 then receives power supply from the driving battery 11 through the charge/discharge line 31 (Step S50), and converts the power from a direct current to an alternating current to supply the power to electrical equipment in the house 20 (Step S60).

In Step S20, if the SOC of the driving battery 11 is less than the predetermined value $\alpha$, representing that power cannot be supplied to the house 20, the vehicle controller 13 transmits, to the equipment controller 23 through the communication line 50, information indicating that power cannot be supplied (Step S70). Upon receiving the information, the equipment controller 23 transmits a command to stop power supply to the power converter 21 (Step S80). The power converter 21 then stops the power supply from the driving battery 11 (Step S90).

[3. Advantageous Effects]

According to the power control system of the embodiment, even if no driving power is supplied to the power converter 21 in the house 20 in emergency where no power is supplied to the house 20 due to a power outage or failure, such as disconnection, connecting the electric vehicle 10 and the house 20 with the single cable 30 allows power supply to the electrical equipment in the house 20.

Specifically, the control power can be supplied from the auxiliary battery 12 mounted in the electric vehicle 10 to the power converter 21 and the equipment controller 23 in the house 20. Accordingly, the power from the driving battery 11 mounted in the electric vehicle 10 can be supplied to the house 20, and thus the electrical equipment in the house 20 can be used, including an emergency lamp, an emergency call device, and an emergency wireless device. Since the control power is also supplied to the equipment controller 23, the electrical energy to be converted by the power converter 21 and supplied to the electrical equipment can be controlled, thus allowing appropriate control of start and stop of power supply.

In addition, a power storage device, such as an emergency battery is not necessary in the house 20 to drive the power converter 21, thus securing the space and further reducing the cost. Furthermore, the charge/discharge line 31, the equipment control line 32, the switch line 34, and the communication line 50 are integrated in the single cable 30, which simplifies the configuration, reduces the cost, and facilitates the attachment and detachment of the system.

The vehicle controller 13 always monitors the SOC of the driving battery 11 to control the discharge based on the SOC, thus preventing over-discharge of the driving battery 11.

Furthermore, the relay 14 is provided on the vehicle control line 33; the start switch 27 is provided to switch the state of connection of the relay 14; and the equipment control line 32 is branched on the downstream side of the relay 14. Thereby, the operation state of the equipment controller 23 can be linked to the operation state of the vehicle controller 13. While the start switch 27 is disconnected, both the equipment controller 23 and the vehicle controller 13 are not operated, thus preventing wasteful power consumption.

Since the start switch 27 is installed in the house 20, power supply from the driving battery 11 can be started at the exterior of the electric vehicle 10 to enhance convenience. Furthermore, with the holding switch 16, the relay 14 can automatically remain connected after operation of the start switch 27.

[4. Miscellaneous]

The embodiment of the present invention is described above. The present invention, however, is not limited to this embodiment, but may be modified in a variety of ways within the scope of the intention of the present invention.

The power control system explained in the embodiment includes the devices and circuits in the electric vehicle 10 and the devices and circuits in the house 20. However, the devices and circuits in the electric vehicle 10 function as a vehicle power control device that have similar functions to those in the embodiment, as long as the power converter 21 is installed in advance at a building, not only at a house, but also to plant factories, and garages.

Figure 5:
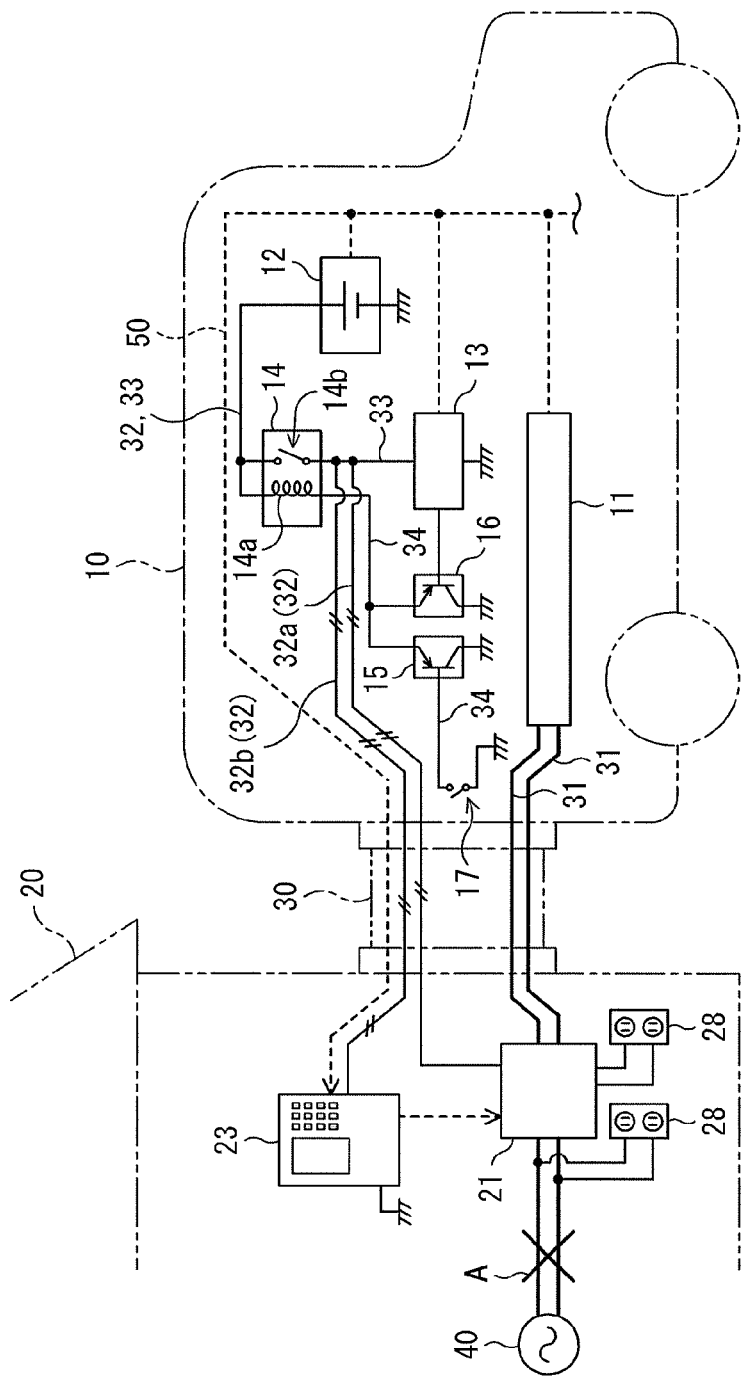
FIG. 5 is a schematic block diagram illustrating a configuration of a power control system according to another embodiment of the present invention.

Furthermore, the start switch 27 is provided in the house 20, the exterior of the electric vehicle 10, in the embodiment. However, the location of the start switch 27 is not limited to the house 20, but may be the electric vehicle 10, as shown in FIG. 5. In this case, turning on a start switch 17 provided in the vehicle also starts power supply from the driving battery 11. Thus, the operation described above can be performed while the state of the driving battery 11 in the vehicle is being checked.

The start switches 17 and 27 may be of an on/off type, instead of a push type. In the case of the on/off type, once the start switch is turned on, the relay 14 remains conducted. The holding switch 16 is thus no longer necessary. Furthermore, the activating switch 15 may be omitted in the embodiment to simplify the configuration and reduce the cost.

Without the start switches 17 and 27 and the relay 14, the charge/discharge line 31 and the equipment control line 32 in the cable 30 may be connected between the electric vehicle 10 and the power converter 21 such that supplying of the control power from the auxiliary battery 12 automatically starts. The power converter 21 may be disposed at a garage outside of the house 20.

The equipment controller 23 can be omitted. In such a case, the electrical energy converted by the power converter 21 may be manually controlled. The vehicle controller 13 can also be omitted. The state of charge of the battery may be visually checked with a meter in this case. Furthermore, the charge/discharge line 31 and the equipment control line 32 may be separated from the single cable 30.

The equipment control line 32 may be a single line having a branch to the power converter 21 and the equipment controller 23, instead of the two-line configuration including the power conversion line 32a and the equipment line 32b.

In emergency where no power is supplied to the house 20 due to a power outage or failure, such as disconnection, power from the driving battery 11 of the electric vehicle 10 is converted from a direct current to an alternating current by the power converter 21, and is supplied to the electrical equipment in the house 20 in the embodiment. Alternatively, a power generator can be connected to the power converter 21 to convert the generated power from an alternating current to a direct current in the power converter 21 and to charge the driving battery 11 of the electric vehicle 10 during a power shut-off. In this case, control power to drive the power converter 21 is also supplied from the auxiliary battery 12 of the electric vehicle 10.

In the exemplary embodiment, the power control system is applied to the electric vehicle. Any vehicle that has at least two separate batteries may be used as a vehicle in the power control system. Such examples may include battery electric vehicles, plug-in hybrid vehicles, and hydrogen fuel cell vehicles.

According to the power control system of the present invention, the first controller that controls the electrical energy converted by the power converter is provided to be activated by the control power of the second battery. Thus, the electrical energy supplied to electrical equipment can be controlled and power supply can be started or stopped.

Furthermore, the second controller and the communication line may be provided, the second controller monitoring the state of charge of the first battery, the communication line transferring information on the state of charge. Thereby, control of the electrical energy based on the state of charge of the first battery prevents over-discharge of the first battery.

In addition, the relay may be provided on the third connection line; the start switch may be provided to switch the state of connection of the relay; and the second line may be provided on the downstream side of the relay. Thus, the operation state of the first controller can be linked to the operation state of the second controller. While the start switch is disconnected, both the first controller and the second controller are not operated, thus preventing wasteful power consumption.

In the case where the start switch is provided in a vehicle, power supply from the first battery can be started or stopped on the vehicle. Thus, the operation described above can be performed while the state of the first battery in the vehicle is being checked.

In the case where the start switch is provided at a building and the fourth communication line is provided to connect the start switch and the relay, power supply from the first battery can be started outside the vehicle to enhance convenience. In the case where the activating switch and the holding switch are provided, in particular, the relay can automatically remain connected after operation of the start switch.

Furthermore, the first connection line and the second connection line are integrated in the single cable, which simplifies the configuration, reduces the cost, and facilitates attachment and detachment of the system.

Even without driving power for the power converter installed at the building, the vehicle power control device of the present invention can supply power from the vehicle to electrical equipment. For instance, even in a power outage at a house in which the power converter is installed, electrical equipment in the house can be used, including an emergency lamp, an emergency call device, and an emergency wireless device. Furthermore, a power storage device for emergency, such as an emergency battery is not necessary in the house, thus securing the space and reducing the cost.

REFERENCE SIGNS LIST 10 electric vehicle (vehicle)
11 driving battery (first battery)
12 auxiliary battery (second battery)
13 vehicle controller (second controller)
14 relay
15 activating switch
16 holding switch
17 start switch
20 house (building)
21 power converter
23 equipment controller (first controller)
27 start switch
28 outlet
30 cable
31 charge/discharge line (first connection line)
32 equipment control line (second connection line)
32a power conversion line (second connection line)
32b equipment line (second connection line)
33 vehicle control line (third connection line)
34 switch line (fourth connection line)
40 power line
50 communication line

What is claimed is:

1. A power control system comprising:
a vehicle comprising a first battery and a second battery separate from the first battery;
a power converter provided at a building, the power converter converting power charged in the first battery and supplying the converted power to electrical equipment;
a first connection line connecting the first battery and the power converter and supplying the power from the first battery to the power converter; and
a second connection line connecting the second battery and the power converter and supplying control power to activate the power converter from the second battery to the power converter.

2. The power control system according to claim 1, further comprising:
a first controller controlling electrical energy converted by the power converter, wherein
the second connection line connects the second battery and the first controller and supplies control power to activate the first controller from the second battery to the first controller.

3. The power control system according to claim 2, further comprising:
a second controller provided in the vehicle, the second controller monitoring a state of charge of the first battery; and
a communication line connecting the second controller and the first controller and transferring information on the state of charge, wherein
the first controller controls the electrical energy based on the information on the state of charge transferred through the communication line.

4. The power control system according to claim 3, further comprising:
a third connection line connecting the second controller and the second battery and supplying control power to activate the second controller from the second battery to the second controller;
a relay provided on the third connection line; and
a start switch switching a state of connection of the relay, wherein
the second connection line is branched from a downstream side of the relay on the third connection line.

5. The power control system according to claim 4, wherein the start switch is provided in the vehicle.

6. The power control system according to claim 4, wherein the start switch is provided at the building, and the power control system further comprises:
a fourth connection line connecting the start switch and the relay.

7. The power control system according to claim 6, further comprising:
an activating switch provided in the vehicle, the activating switch that is turned on the relay if the start switch is turned on; and
a holding switch provided in the vehicle and controlled by the second controller, the holding switch keeping the connection of the relay.

8. The power control system according to claim 1, wherein the first connection line and the second connection line are integrated in a single cable.

9. A vehicle power control device controlling a power converter provided at a building and supplying power from a vehicle to electrical equipment, the vehicle power control device comprising:
a first battery provided in the vehicle;
a second battery separate from the first battery;
a first connection line connecting the first battery and the power converter and supplying the power from the first battery to the power converter; and
a second connection line connecting the second battery and the power converter and supplying control power to activate the power converter from the second battery to the power converter.

* * * * *